(12) United States Patent  (10) Patent No.: US 8,871,086 B2
Hardison  (45) Date of Patent: Oct. 28, 2014

(54) VALVELESS SIPHON DECANTER AND METHODS OF USE

(76) Inventor: John Charles Hardison, Tulsa, OK (US)

( * ) Notice: Subject to any disclaimer, the term of this patent is extended or adjusted under 35 U.S.C. 154(b) by 896 days.

(21) Appl. No.: 12/754,315

(22) Filed: Apr. 5, 2010

(65) Prior Publication Data

US 2011/0068054 A1    Mar. 24, 2011

Related U.S. Application Data

(60) Provisional application No. 61/234,337, filed on Aug. 17, 2009.

(51) Int. Cl.
  *B01D 21/24* (2006.01)
  *B01D 21/30* (2006.01)
  *B01D 21/34* (2006.01)

(52) U.S. Cl.
  CPC ........ *B01D 21/2444* (2013.01); *B01D 21/2433* (2013.01); *B01D 21/34* (2013.01)
  USPC ........ 210/109; 210/242.1; 210/523; 137/135; 137/143; 137/147; 137/152

(58) Field of Classification Search
  None
  See application file for complete search history.

(56) References Cited

FOREIGN PATENT DOCUMENTS

| CN | 2928833 Y | * | 8/2007 |
| DE | 2715622 A | * | 10/1977 |
| DE | 29620105 U1 | * | 3/1998 |

OTHER PUBLICATIONS

English translation of CN 2928833 Y, Aug. 2007.*
English translation of DE 2715622 A, Oct. 1977.*
English translation of DE 29620105 U1, Mar. 1998.*

* cited by examiner

*Primary Examiner* — Terry Cecil
(74) *Attorney, Agent, or Firm* — John M. Behles (57) ABSTRACT

A valveless siphon decanter for processing fluid within a tank having a siphon tube external to the tank, the siphon tube having an output, a boom extending substantially transversely from the siphon tube, the boom providing a path for the communication of fluid from within the tank into the siphon tube, a vacuum head in association with the boom, the vacuum head having at least one orifice disposable within the tank for receiving the fluid, a vacuum source for creating a vacuum within the siphon tube and the boom to draw the fluid in through the at least one orifice of the vacuum head into the boom and into the siphon tube thereafter, a vacuum break for breaking the vacuum within the boom and the siphon tube; and wherein the siphon tube and the boom are disposed outside of the tank.

19 Claims, 10 Drawing Sheets

VALVELESS SIPHON DECANTER AND METHODS OF USE

CROSS-REFERENCE TO RELATED APPLICATION(S)

This application claims the benefit of U.S. Provisional Application Ser. No. 61/234,337 filed Aug. 17, 2009, entitled "VALVELESS SIPHON DECANTER AND METHODS OF USE," which is hereby incorporated herein by reference in its entirety, including all references cited therein.

BACKGROUND OF THE INVENTION

1. Field of the Invention

The present invention relates in general to a wastewater decanter and, more particularly, but not by way of limitation, to a valveless siphon decanter which can substantially exclude solids and can be retrofit into existing sequencing batch reactor systems to replace current wastewater decanters.

2. Background Art

The treatment of wastewater is well known in the art. Commonly, sequencing batch reactors or SBRs are used to process wastewater and can include two or more processing tanks. SBRs treat wastewater such as sewage or output from anaerobic digesters or mechanical biological treatment facilities in batches. The tanks have a "flow through" system, with raw wastewater (influent) entering through an inlet and treated fluid (effluent) flowing out the other. While one tank is in settle/decant mode the other may be aerating and filling. At the inlet is a section of the tank known as the bio-selector. This consists of a series of walls or baffles which direct the flow either from side to side of the tank or under and over consecutive baffles. The walls or baffles help to mix the incoming influent and any returned activated sludge, beginning the biological digestion process before the wastewater enters the main part of the first tank.

Typically, there are five stages in the treatment of wastewater including filling the tank, reacting the wastewater with biological agents, allowing the solids to settle from the wastewater, drawing the treated fluid from the first tank and idling the removed fluid in a second tank. Aeration of the mixed wastewater is performed during the first two stages by the use of fixed or floating mechanical pumps or by blowing it into finely perforated membranes fixed to the floor of the tank. During this period the inlet valve to the tank is open and a returned activated sludge pump takes mixed liquid and solids (mixed liquor) from the outlet end of the tank to the inlet to "seed" the incoming sewage with live bacteria.

After the step of settling, the wastewater is stratified such that the solids are disposed at the bottom of the tank, a mixture of solids and biological agents are disposed above the solids, and a level of cleaner fluid is disposed at the surface of the tank. Currently, the step of drawing the cleaner fluid from the first tank is facilitated by the use of something such as a floating decanter. While wastewater decanters are well known, they suffer from common drawbacks including, but not limited to, portions of the decanter being disposed underneath the fluid leading to unnecessary and costly maintenance thereof and unwanted removal of solids from the reactor which can cause fouling of the decanter and thus increased maintenance. Common decanters include a gravity inlet orifice supported above or below the fluid by a flotation device. The gravity inlet orifice is connected to a tubular boom or outlet pipe that extends from near the bottom of the tank and angles upwardly towards the cleaner fluid such that the gravity inlet orifice is disposed just below the surface of the fluid.

Therefore the need exists for a valveless siphon decanter for use in wastewater reactors that substantially excludes solids during operation thereof, and furthermore to a valveless siphon decanter which can be installed through or over the tank in such a way that none of the parts of the decanter are submerged under the wastewater contained within the reactor.

SUMMARY OF THE INVENTION

In one embodiment, the present invention is directed to a valveless siphon decanter for processing fluid within a tank, comprising: (a) a siphon tube external to the tank, the siphon tube having an output; (b) a boom extending substantially transversely from the siphon tube, the boom providing a path for the communication of fluid from within the tank into the siphon tube; (c) a vacuum head in association with the boom, the vacuum head having at least one orifice disposable within the tank for receiving the fluid; (d) a vacuum source for creating a vacuum within at least one of the siphon tube and the boom to draw the fluid in through the at least one orifice of the vacuum head into the boom and into the siphon tube thereafter; (e) a vacuum break for breaking the vacuum within at least one of the boom and the siphon tube; and (f) wherein the siphon tube and the boom are disposed outside of the tank.

In another embodiment, the siphon tube includes a flexible section of pipe located below the intersection point between the boom and the siphon tube to allow the boom and the first portion of the siphon tube to pivot about the second portion of the siphon tube.

In an additional embodiment, the decanter further comprises at least one stabilizer bar connected to the first portion and the second portion, above and below the flexible section of pipe to support the flexible section of pipe.

In yet another embodiment, the boom intersects the siphon tube to bifurcate the siphon tube into a first portion and a second portion.

In accordance with the present invention, the boom is pivotally connected to a sidewall of the tank.

In an additional embodiment, the vacuum break includes a sensor that senses the level of fluid within the siphon tube and a control system monitoring output of the sensor, wherein the control system controls the operation of the vacuum source based upon output received from the sensor.

In one embodiment, the vacuum break includes a pipe connected to the siphon tube proximate the first portion of the siphon tube, the pipe having a terminal end disposed within the tank, wherein when the level of fluid within the tank goes below the terminal end of the pipe, the vacuum drawing fluid into the boom and siphon tube is broken causing a cessation of fluid flow.

In an additional embodiment, the pipe is selectively adjustable to raise or lower the terminal end of the pipe within the tank.

In another embodiment, the vacuum head includes an elongated tubular member having a center, opposing ends, and plurality of orifices spaced apart from one another.

In yet another embodiment, the diameter of the orifices increases from the center of the elongated tubular member outwardly towards the ends of the elongated tubular member.

In accordance with the present invention, the decanter further comprises at least one pontoon associated with the elongated tubular member for floatably supporting the elongated tubular member on the surface of the fluid within the tank.

In one embodiment, the decanter further comprises a buoyancy system for adjusting the buoyancy of the at least one pontoon.

In accordance with the present disclosure, the buoyancy system includes: (i) a fluid source in communication with the at least one pontoon via a pump capable of bidirectional fluid flow for introducing or removing fluid into the at least one pontoon; (ii) means for determining the buoyancy of the at least one pontoon; and (iii) a control system in communication with the means for determining the buoyancy of the at least one pontoon and controlling the operation of the pump.

In one embodiment, the decanter further comprises two elongated pontoons and a central pontoon, one of the elongated pontoons disposed along a front surface of the elongated tubular member and the other elongated pontoon disposed along a rear surface of the elongated tubular member, the central pontoon disposed between the two elongated pontoons and below the center of the elongated tubular member.

In yet another embodiment, the decanter further comprises a plurality of baffles extending between the two elongated pontoons, the baffles extending through a centerline of the orifices and at each of the opposing ends of the elongated tubular member.

In an alternative embodiment, the baffles include mesh screens to further prevent debris from entering the orifices.

In accordance with the present disclosure, the decanter further comprises support legs extending downwardly from the vacuum head, the support legs contacting a bottom portion of the tank when the vacuum head has translated downwardly a predetermined distance into the tank.

In one embodiment, the vacuum head is connected to the boom via a flexible hose.

In another embodiment, the present invention is directed to a sequencing batch reactor for processing wastewater, comprising: (a) a tank for retaining and stratifying the wastewater to produce at least a substantially clear layer of water disposed below a debris layer; (b) a siphon tube external to the tank, the siphon tube having an output; (c) a boom extending substantially transversely from the siphon tube, the boom providing a path for the communication of water from within the tank into the siphon tube; (d) a vacuum head in association with the boom, the vacuum head having at least one orifice disposed within the tank for receiving the water; (e) means for positioning the at least one orifice of the vacuum head in the clear layer of water below the debris layer; (f) a vacuum source for creating a vacuum within at least one of the siphon tube and the boom to draw the clear water in through the at least one orifice of the vacuum head into the boom and into the siphon tube thereafter; (g) a vacuum break for breaking the vacuum within at least one of the boom and the siphon tube; and (h) wherein the siphon tube and the boom are disposed outside of the tank.

In an additional embodiment, the at least one orifice includes at least one pontoon associated with the elongated tubular member.

In yet another embodiment, the decanter further comprises a buoyancy system for adjusting the buoyancy of the at least one pontoon.

In one embodiment, the buoyancy system includes: (i) a fluid source in communication with the at least one pontoon via a pump capable of bidirectional fluid flow for introducing or removing fluid into the at least one pontoon; (ii) means for determining the buoyancy of the at least one pontoon; and (iii) a control system in communication with the means for determining the buoyancy of the at least one pontoon and controlling the operation of the pump.

BRIEF DESCRIPTION OF THE DRAWINGS

Certain embodiments of the present invention are illustrated by the accompanying figures. It will be understood that the figures are not necessarily to scale and that details not necessary for an understanding of the invention or that render other details difficult to perceive may be omitted. It will be understood that the invention is not necessarily limited to the particular embodiments illustrated herein.

The invention will now be described with reference to the drawings wherein.

DETAILED DESCRIPTION OF THE INVENTION

While this invention is susceptible of embodiment in many different forms, there is shown in the drawings and will herein be described in detail several specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings with like reference characters.

Referring now to the drawings, and in particular to FIGS. 1-5 collectively, shown therein is one embodiment of a valveless siphon decanter, hereinafter referred to as the decanter 10 for use with a wastewater reactor. The reactor system includes one or more tanks 12 with an inlet providing wastewater communicated from a wastewater source (not shown) into the tank 12. The tank 12 receives and holds wastewater allowing the wastewater to stratify into separate levels including a solids level located at the bottom of the tank 12, an intermediate level that includes small particulate matter suspended in the fluid, and a layer of substantially clear fluid disposed near the top of the tank 12. The clear fluid is preferably removed via the decanter 10 in accordance with the present invention.

The decanter 10 preferably includes a boom 14 that extends from at least the edge of the tank 12 and extends at least partially into the tank 12. The boom 14 is preferably positioned above the top of the wastewater as will be discussed in greater detail infra.

In one embodiment, the boom 14 is preferably an elongated tubular member providing fluid communication between the tank 12 of the boom 14 and a siphon tube 16 which preferably includes an outlet for discharging processed water to a secondary tank 18, also known as an equalization and/or chlorine contact tank. The boom 14 is preferably pivotally connected to a top edge 20 of the tank 12 via a cradle 22, although it will be understood that the boom 14 may include any number of different means for pivotally connecting the boom 14 to the top edge 20 of the tank 12 that would be known to one of ordinary skill in the art with the present disclosure before them.

The boom 14 preferably extends transversely from and bifurcates the siphon tube 16 into first and second portions 24 and 26. The first portion 24 of the siphon tube 16 extends above the boom 14 and the second portion 26 of the tube extends at least partially below the boom 14.

In one embodiment, a vacuum pump 28 is disposed towards the top of the first portion 24 of the siphon tube 16. The vacuum pump 28 creates a vacuum within the system that draws fluid into the boom 14 via a vacuum head 30 as will be discussed in greater detail infra.

Fluid communicating through the boom 14 travels downwardly through the siphon tube 16 into the second portion 26 of the siphon tube 16 until the second portion 26 is filled. When the second portion 26 of the siphon tube 16 is filled with fluid, the vacuum created by the vacuum pump 28 will begin to draw fluid upwardly into the first portion 24 of the siphon tube 16. A sensor 32 associated with the decanter 10 senses the level of the fluid within the siphon tube 16 and outputs a signal indicative of the level of fluid within the siphon tube 16. A control system 34 automatically and continuously, or periodically, monitors the output of the sensor 32 and communicates with the vacuum pump 28 to control the operation of the vacuum pump 28. As such, the control system 34 is capable of maintaining the fluid level within the siphon tube 16 (and therefore the flow rate) at a predetermined level. It will further be understood that because the decanter 10 utilizes a vacuum pump 28 to draw fluids into the decanter 10, atmospheric air drawn into the decanter 10 contemporaneously with the fluids can be metered, thus allowing for the decanter 10 to be operated at high discharge flow rates. In other words, the utilization of vacuum pressure within the decanter 10 allows for high flow rate discharge during high flow rate input into the tank 12.

Additionally, a liquid or gas disinfectant compounds commonly utilized in reactors may be drafted into the decanter 10 along with the fluid rather than mixed in a separate process. The disinfectant compound may float along the top of the fluid or may be at least partially mixed with the fluid. When the vacuum pump 28 draws the disinfectant compound and fluid into the decanter 10 together, the disinfectant and fluid are mixed thoroughly within at least a portion of the decanter 10. The act of mixing a disinfectant compound and fluid within the decanter 10 substantially eliminates the need for a secondary equalization tank and further processing via a disinfection system, which is required with typical single batch reactors.

In an additional embodiment, the decanter 10 may also include a vacuum break 36 which allows for a controlled flow of fluids through the decanter 10. Stated otherwise, the addition of the vacuum break 36 allows for automatic decanter level control. The vacuum break 36 may include a check valve in combination with a pipe 38. In one embodiment, the pipe 38 is connected to the first portion 24 of the siphon tube 16. A terminal end of the pipe 38 is disposed a predetermined distance down into the fluid within the tank 12. The location of the terminal end of the pipe 38 is selectively adjustable such that the vacuum break level for the system may be varied in the field. In operation, when the level of fluid within the tank 12 falls below the terminal end of the pipe 38, air flows into the pipe 38 breaking the vacuum within the system and therefore interrupting the flow of fluid through the boom 14.

It will be understood that the use of a vacuum break 36 allows the system to run without constant operation of the vacuum pump 28, significantly increasing the energy efficiency of the decanter 10. That is, once the vacuum pump 28 causes a predetermined amount of fluid to be drawn into the siphon tube 16, hydrostatic pressure within the decanter 10 maintains the flow of fluid from the tank 12 through the siphon tube 16 until the fluid level in the tank falls below the terminal end of the pipe 38 breaking the vacuum within the decanter 10.

As stated previously, the siphon tube 16 is an elongated tubular member fabricated from a strong and resilient material that is bifurcated into first and second portions 24 and 26 via the boom 14. In one embodiment, the first portion 24 of the siphon tube 16 is connected to the second portion 26 via a flexible tubular member 40. The flexible tubular member 40 is connected to the bottom of the first portion 24 of the siphon tube 16 and the top end of the second portion 26 of the siphon tube 16. The flexible tubular member 40 may be fabricated from any number of flexible and/or resilient materials such as a plastic or polymer, or a rubber. Additionally, the flexible tubular member 40 may also be fabricated from a metal or other rigid or partially rigid material constructed to flex or bend. It will be understood that the flexible tubular member 40 may be fabricated from a variety of materials having varying physical properties so long as the flexible tubular member 40 allows the first portion 24 of the siphon tube 16 to pivot about the second portion 26 of the siphon tube 16 while maintaining a path for fluid communication therethrough.

The flexible tubular member 40 may include a support member 42 for supporting the first and second portions 24 and 26 of the siphon tube 16 in a spaced apart relationship. In one embodiment, the support member 42 may include a rigid and/or semi rigid dowel, for example, a section of all-thread.

In an additional embodiment, the vacuum head 30 preferably includes an elongated tubular member 44 that floats above the top of the wastewater via one or more pontoons 46. The elongated tubular member 44 includes a plurality of apertures or orifices 48 disposed along the bottom of the elongated tubular member 44. The orifices 48 may have any number of shapes and/or sizes that can vary according to design requirements including, but not limited to flow rate, vacuum pressure, and the like. The orifices 48 may be substantially equally or unequally spaced along the bottom of the elongated tubular member 44 and are adapted to provide a path for communication of fluids between the tank 12 and the boom 14. In one embodiment, the diameter of the orifices 48 increases with the distance that the orifices 48 are spaced from a center point 50 of the elongated tubular member 44.

In one embodiment, the one or more pontoons 46 include four elongated pontoons 52 and a central pontoon 54. The elongated pontoons 52 extend along the elongated tubular member 44 and each elongated pontoon 52 includes a length 56, a width 58 and a height 60. The elongated pontoons 52 are connected to the elongated tubular member 44 in pairs such that one of the elongated pontoons 52 is disposed frontwardly of the elongated tubular member 44 and one is disposed rearwardly.

Each of the elongated pontoons 52 is preferably fabricated as a hollow enclosure filled with air, or a buoyant material such that the elongated pontoon 52 may float on top of the fluid within the tank 12. In accordance with the present disclosure, the elongated pontoons 52 extend a predetermined distance below the bottom of the elongated tubular member 44. It will be understood that the widths 58 of the elongated pontoons 52 are sized such that they substantially preclude solids floating on the surface of the fluid from traveling under the elongated pontoons 52 and up through the orifices 48. Moreover, as the width 58 of the elongated pontoons 52 increases, the likelihood of solids traveling underneath the elongated pontoons 52 decreases.

Each of the pairs of elongated pontoons 52 on either side of the elongated tubular member 44 are connected together via a sidewall 62 and one or more baffles 64 extending between the elongated pontoons 52. The sidewalls 62 and baffles 64 cooperate to define enclosures 66. In one embodiment, the baffles 64 are oriented along the midline of each of the orifices 48. In other embodiments, the baffles 64 may be disposed between each of the orifices 48. Furthermore, the baffles 64 may include one or more apertures or filters, which provide paths of fluid communication between the enclosures 66.

In accordance with the present invention the central pontoon 54 is a sealed container filled with a fluid such as air and is positioned substantially below the intersection of the boom 14 and elongated tubular member 44.

In one embodiment, the decanter 10 also includes one or more support legs 68 that support the elongated support member 44 above the bottom of the tank 12. More specifically, the support legs 68 are fixedly connected to at least one of the boom 14, center pontoon 54, and the elongated tubular member 44. The support legs 68 may contact the bottom of the tank 12 acting as a stop to prevent excessive downward movement of the elongated tubular member 44. It will be understood that the length of the support legs 68 may vary according to design requirements. Furthermore, it will be understood that the support legs 68 may be selectively adjustable to vary the vertical translation of the elongated tubular member 44.

In operation, the vacuum pump 28 of the decanter 10 is activated creating a vacuum within the decanter 10 that causes the fluid in the tank 12 to be drawn into the enclosures 66 of the elongated pontoons 52. The fluid drawn into the enclosures 66 is directed into the plurality of orifices 48 and then into the boom 14 via the elongated tubular member 44. Hydrostatic pressure drives the fluid through the boom 14 and into the siphon tube 16. When the fluid reaches a predetermined level within the siphon tube 16, for example, when the fluid level begins the reach into the first portion 24 of the siphon tube 16, the sensor 32 outputs a signal indicative of the fluid level to the control system 34. When the control system 34 that receives data from the sensor 32 receives a signal indicative of the water level being within a predetermined level, the control system 34 causes the vacuum pump 28 to cease operation breaking the vacuum within the decanter 10.

It will be understood that as fluid is being drawn from the tank 12, decreasing the level of fluid therein, the elongated tubular member 44 floating on the surface of the fluid moves downwardly in the tank 12 until the support legs 68 contact the bottom of the tank 12.

To install, the cradle 22 is secured to the top edge 20 of a wall of the tank 12. Next, the boom 14 is secured to the cradle 22 such that the boom 14 may pivot about the cradle 22 and vacuum head 30 of the decanter 10 is disposed in the tank 12. It will be understood that the second portion 26 of the siphon tube 16 is associated with the secondary tank 18. It will be further understood that a tank 12 with an existing decanter may be retrofit with the decanter 10 of the present invention without need for removing the old decanter. Furthermore, the decanter 10 is installed such that all parts of the decanter 10, with the exception of the support legs 68 are not submerged in the fluid. Therefore, the parts of the decanter 10 are not subjected to corrosive and/or other types of damage due to contact with the wastewater contained in the tank 12.

Referring now to FIGS. 6-9 collectively, shown therein is another embodiment of a decanter 110 for use in accordance with the present invention. More specifically, the decanter 110 may be used in "through the wall" applications where at least a portion of the decanter 110 extends through the sidewall of the tank 112 rather than "over the wall."

The decanter 110 is constructed similarly to the decanter 10 described above with the exception that the decanter 110 includes only two elongated pontoons 152 connected to the elongated tubular member 144. Two rectangular enclosures 128 are disposed below two sections of the elongated tubular member 144 and are provided to receive fluid from the tank. In one embodiment, the rectangular enclosures 128 include one or more baffles 164 extending between the elongated pontoons 152 for subdividing the rectangular enclosures 128 into a plurality of enclosures 166.

As this embodiment can be used in a "through the wall" application, the boom 114 includes a pivot joint 170 that allows the boom 114 to pivot upwardly and downwardly relative to the sidewall of the tank 112. It will be understood that because the boom 114 pivots via the pivot joint 170, the siphon tube 216 does not have to include a flexible tubular member, although the inclusion of a flexible tubular member is permissible. Although not shown, the discharge end of the siphon tube 216 is disposed within a secondary tank similarly to the siphon tube 16 described above.

Figure 1:
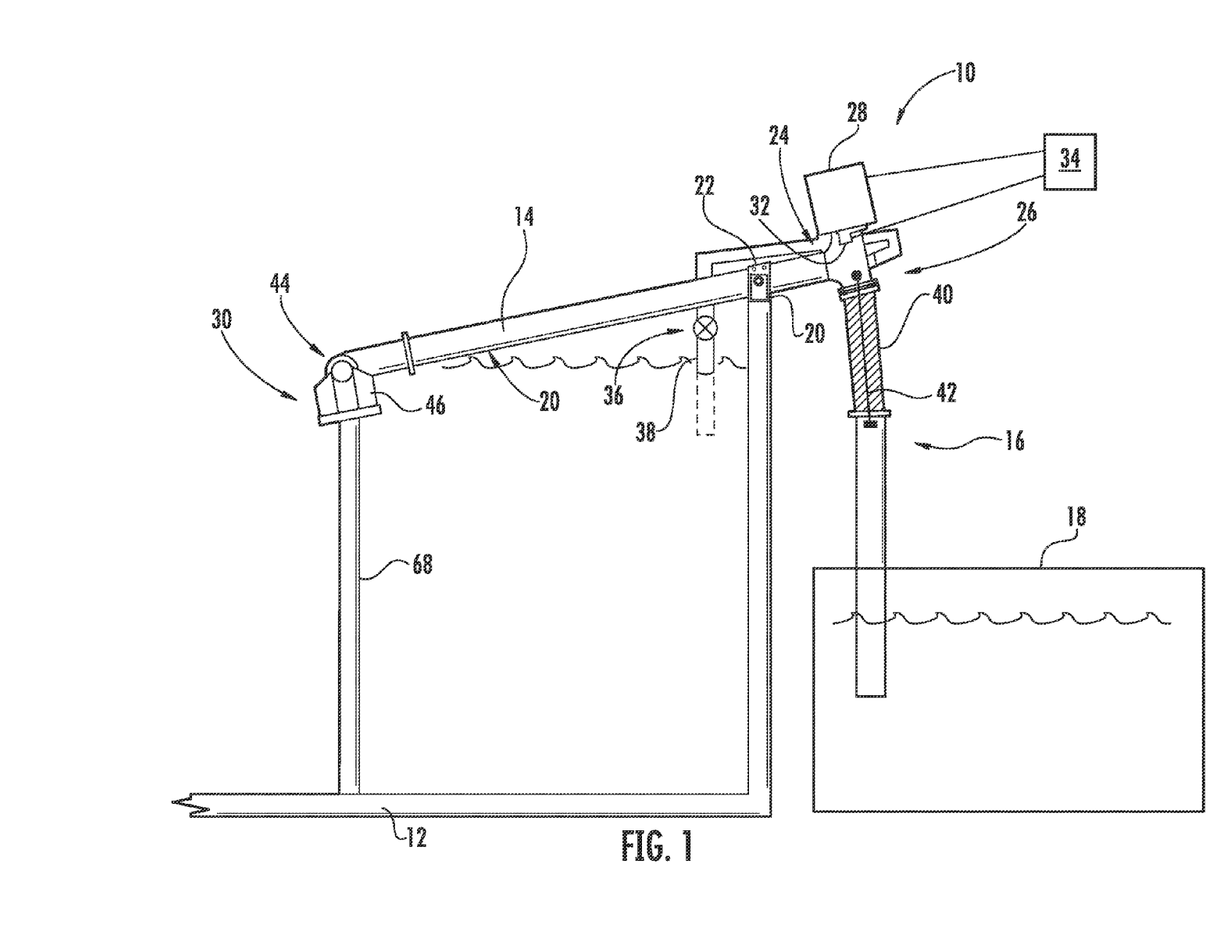
FIG. 1 of the drawings is a perspective view of a valveless siphon decanter for use in a wastewater reactor, constructed in accordance with the present invention.
Figure 2:
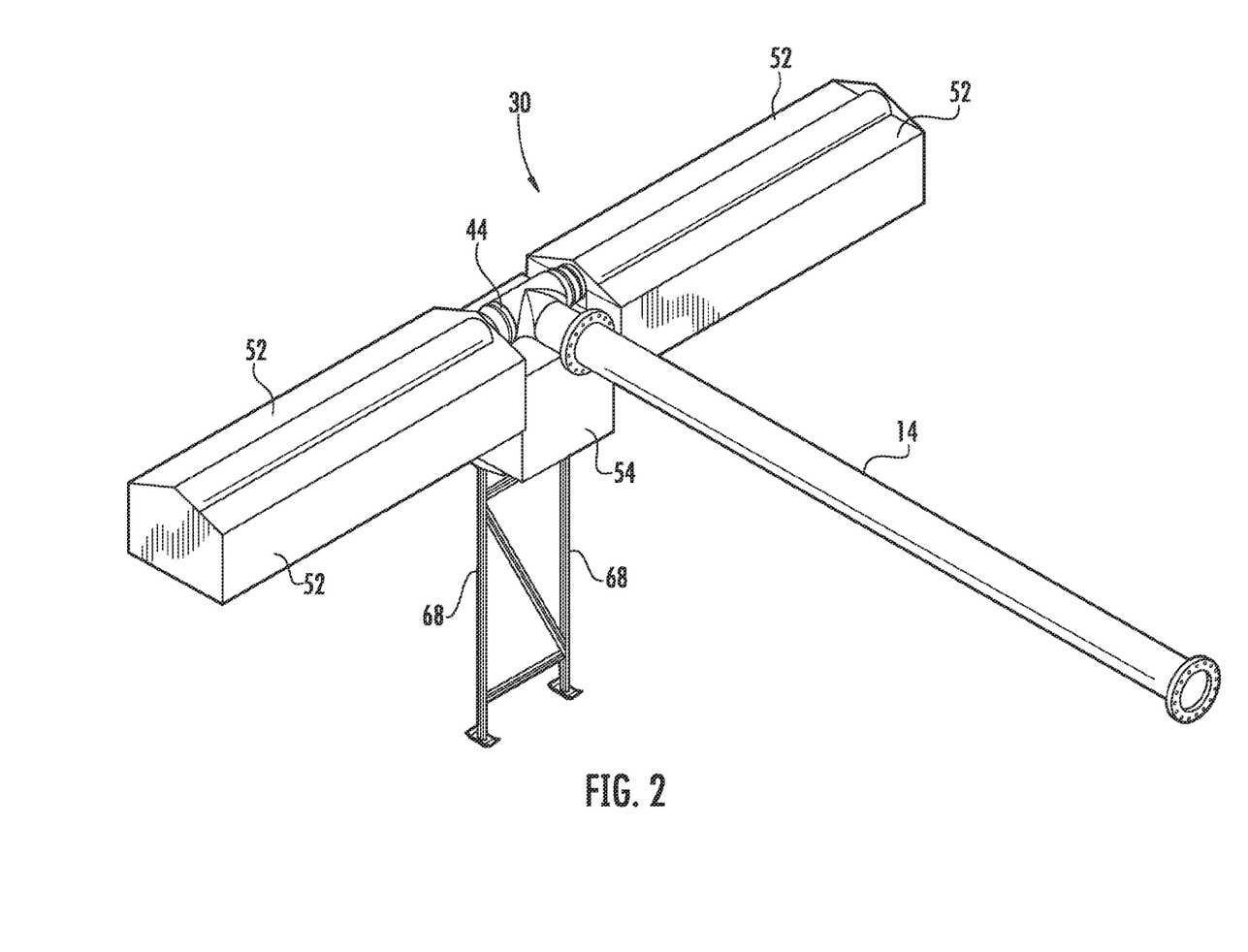
FIG. 2 of the drawings is a perspective view of the valveless siphon decanter of FIG. 1.
Figure 3:
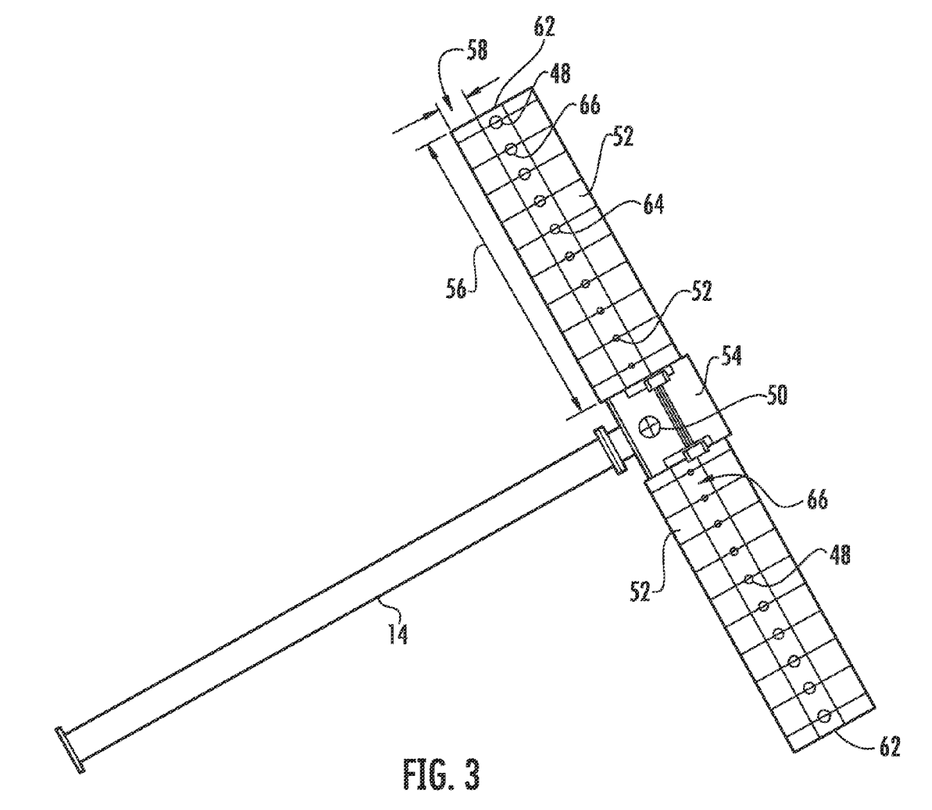
FIG. 3 of the drawings is a fragmented, perspective view of the bottom side of the valveless siphon decanter of FIGS. 1 and 2.
Figure 4:
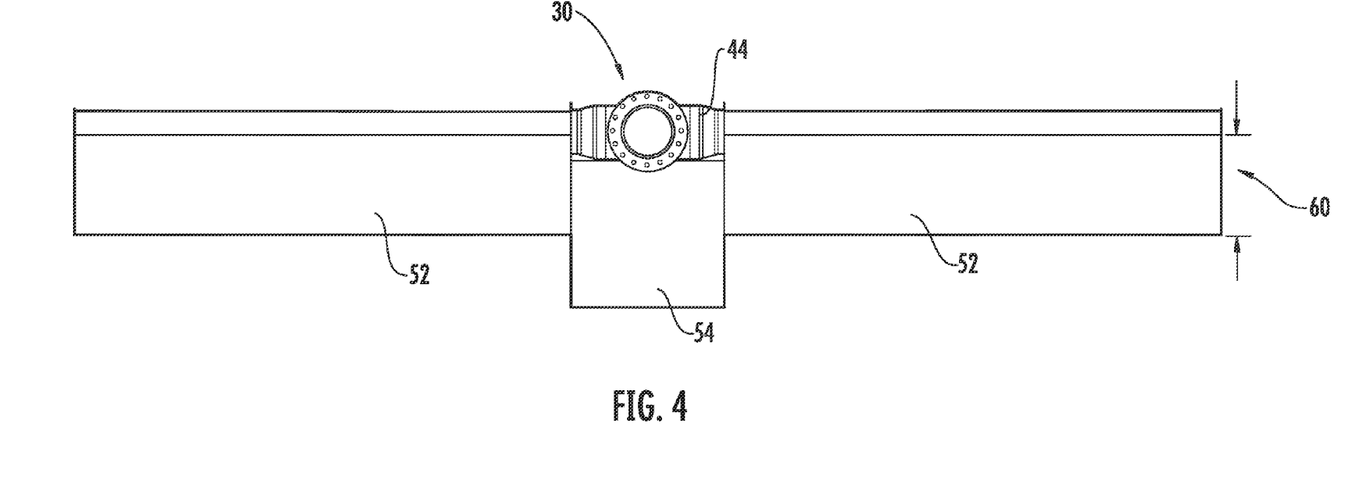
FIG. 4 of the drawings is a fragmented, front elevation view of the valveless siphon decanter of FIGS. 1-3.
Figure 5:
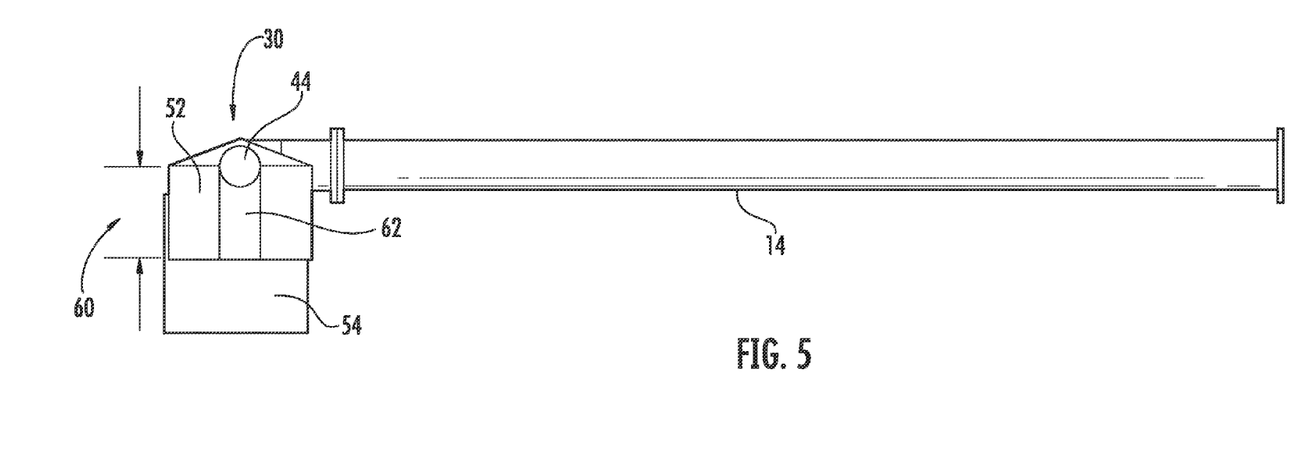
FIG. 5 of the drawings is a fragmented, side plan view of the valveless siphon decanter of FIGS. 1-4.
Figure 6:
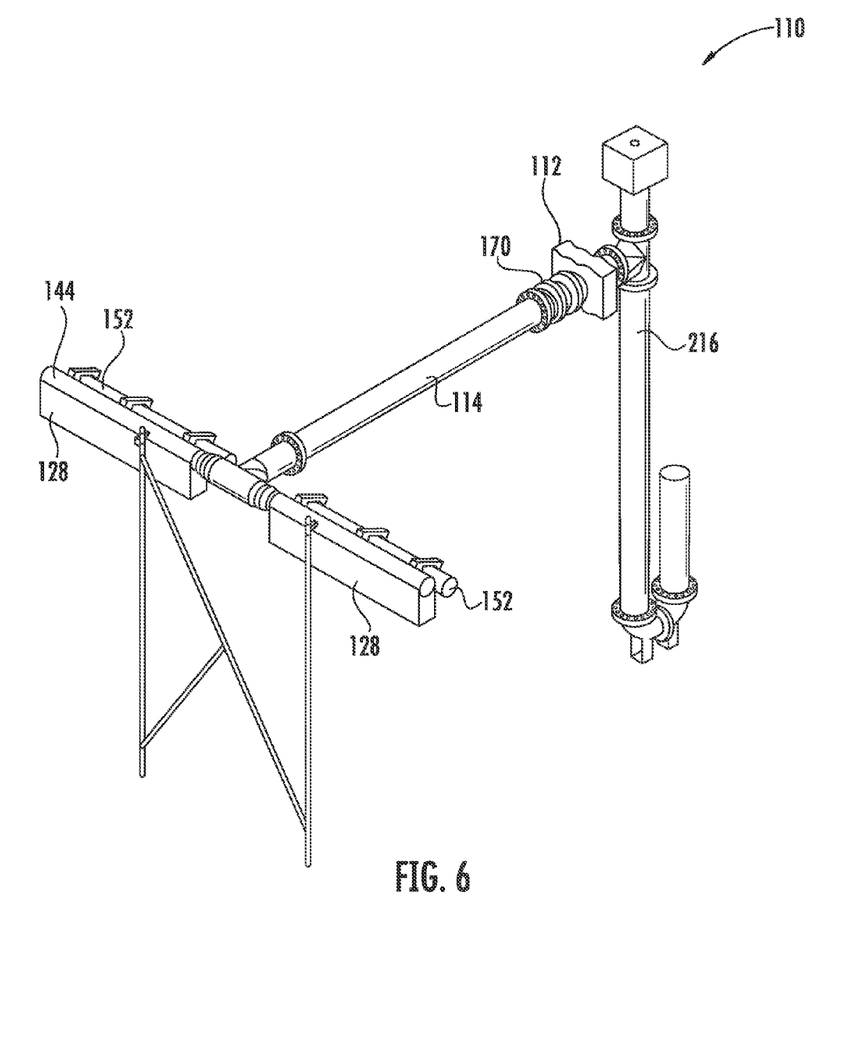
FIG. 6 of the drawings is a perspective view of an alternative embodiment of a valveless siphon decanter.
Figure 7:
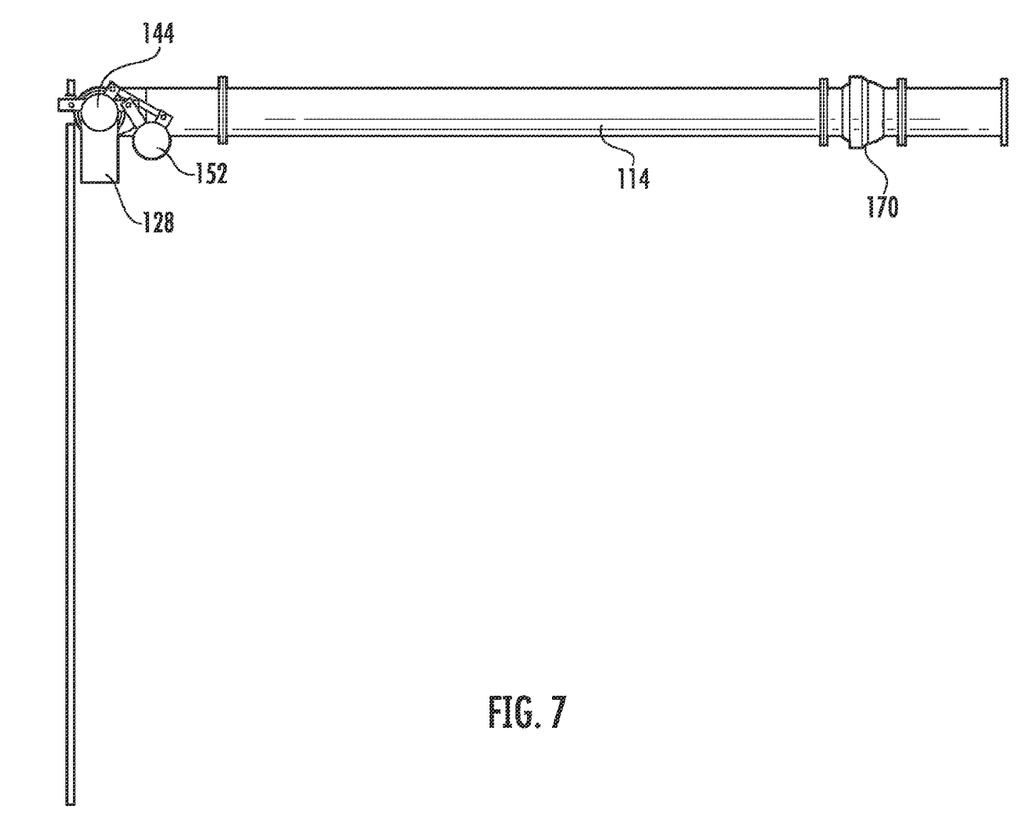
FIG. 7 of the drawings is a side plan view of the decanter sub-assembly of FIG. 6.
Figure 8:
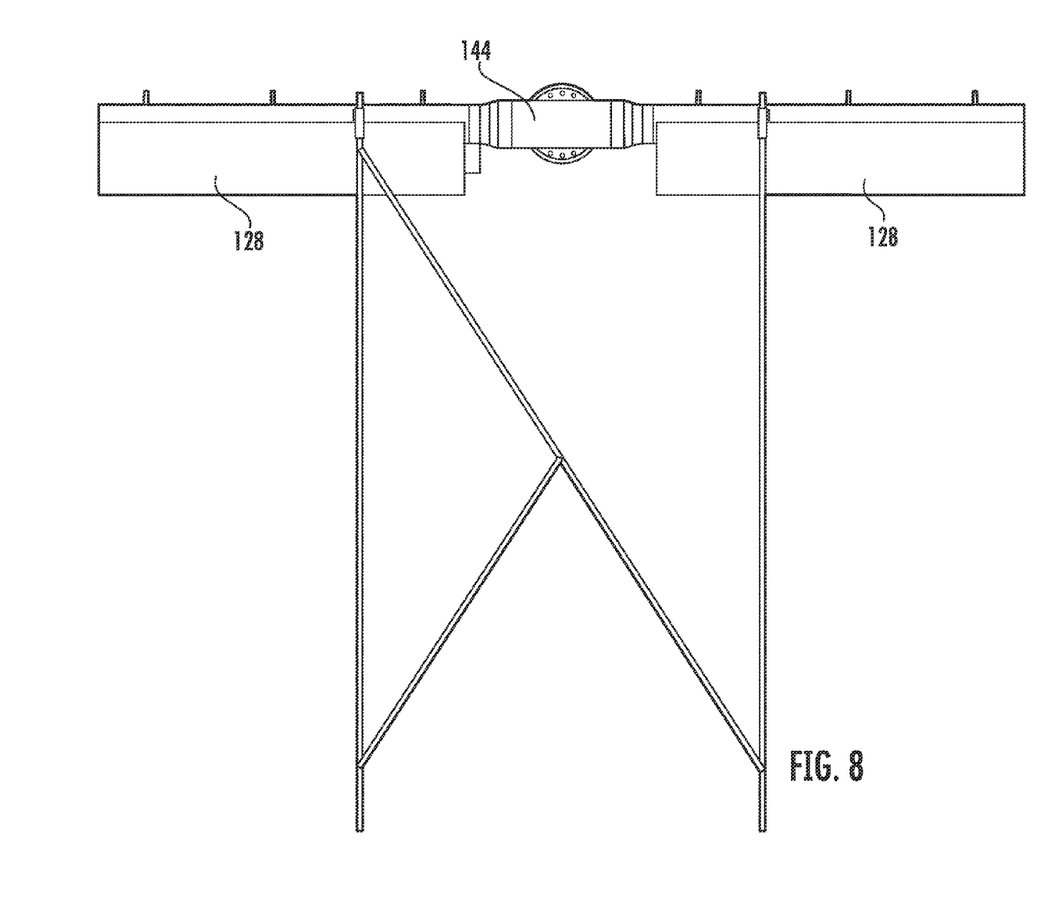
FIG. 8 of the drawings is a front view of the decanter sub-assembly of FIGS. 6 and 7.
Figure 9:
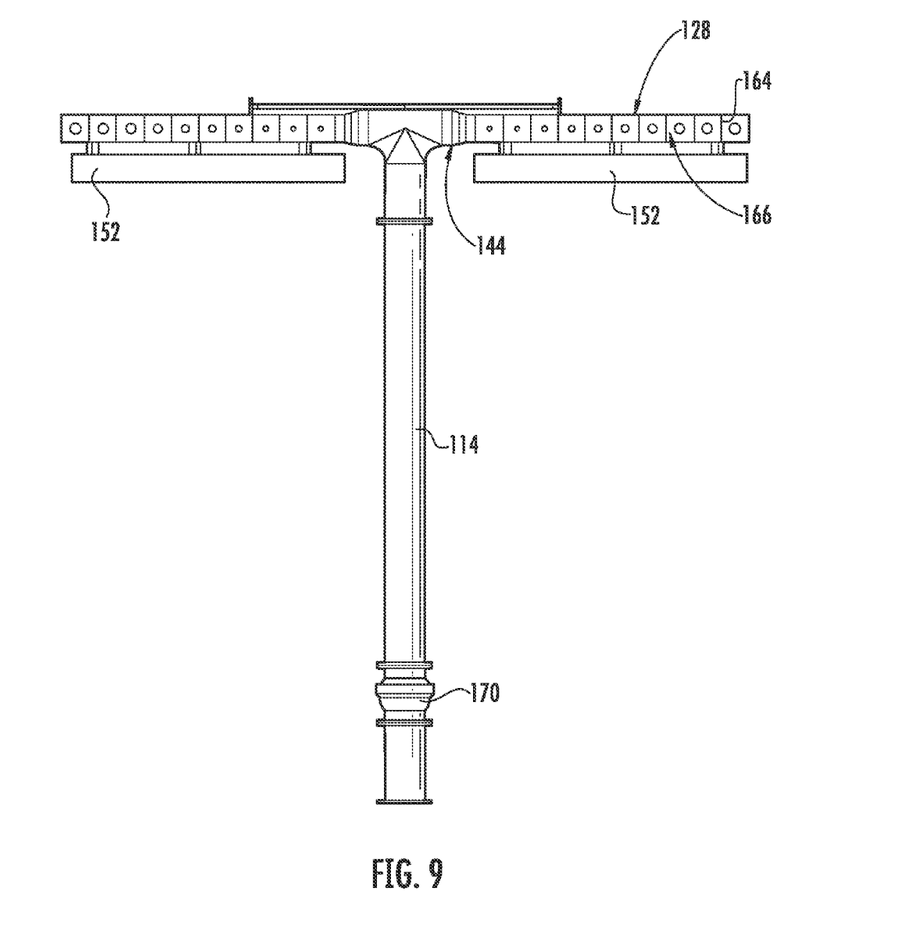
FIG. 9 of the drawings is a bottom plan view of the decanter sub-assembly of FIGS. 7-8.
Figure 10:
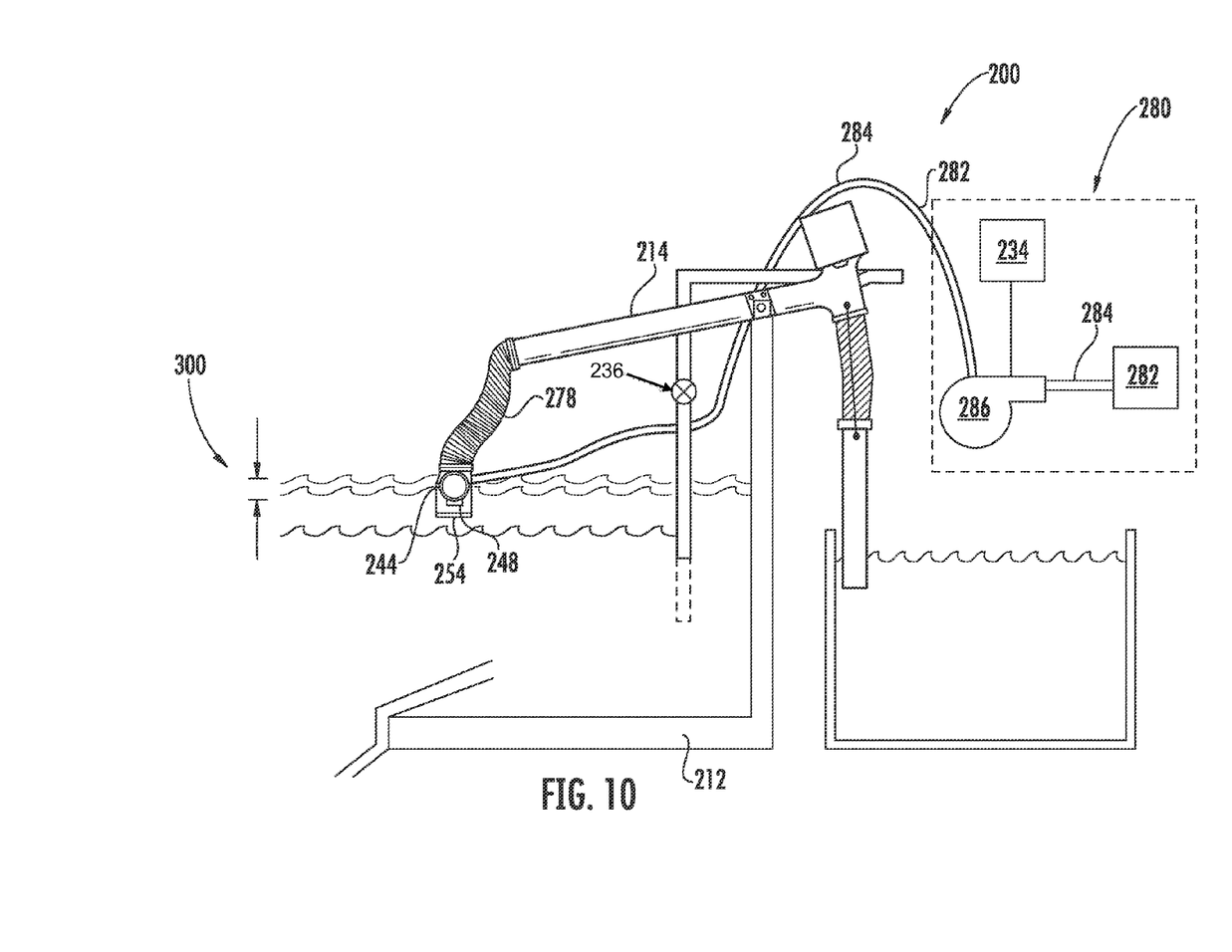
FIG. 10 of the drawings is a side elevation view of an alternative valveless siphon decanter.

Referring now to FIG. 10, shown therein is an alternative embodiment of decanter 10, hereinafter referred to as decanter 200. As stated previously, in any wastewater stratification process a thin layer of debris 300 is commonly found along the surface of the fluid within the tank 212. It is desirable to prevent the communication of the debris 300 from the tank 212 through decanter 200. Therefore, it is advantageous to dispose the orifices 248 of the elongated tubular member 244 below the debris 300 during the decanting process to prevent debris from entering the decanter 200.

To these ends, decanter 200 is designed similarly to decanter 10 with the exception that the elongated tubular member 244 is flexibly connected to the boom 214. Furthermore, the decanter 200 is provided with only a center pontoon 254 that is designed to be selectively adjusted within the tank 212 by varying the overall buoyancy of the elongated tubular member 244 and the center pontoon 254 in combination.

The elongated tubular member 244 is flexibly connected to the boom 214 by a flexible hose 278. The flexible hose 278 allows the elongated tubular member 244 to translate substantially vertically downwardly into the fluid contained within the tank 212, rather than downwardly and arcuately based upon the pivoting of the boom 214 alone.

The center pontoon 254 is disposed proximate the elongated tubular member 244 and can act as both a pontoon and ballast. That is, the center pontoon 254 is operatively connected to a buoyancy control system 280 that includes a fluid source 282 connected to the center pontoon 254 via a fluid path 284 such as a hose or pipe. Between fluid source 282 and center pontoon 254 is a pump 286 capable of facilitating bidirectional fluid flow between fluid source 282 and center pontoon 254. It will be understood that the center pontoon 254 floats when it is mostly filled with air, allowing the elongated tubular member 244 to float on the surface of the liquid in the tank 212. In contrast, as the center pontoon 254 is filled with a liquid it begins to sink. The operation of pump 286 is controlled by control system 234 that also controls the vacuum break 236 that is constructed similarly to the vacuum break 36 of decanter 10. The functional and operational details of the control system 234 will be readily understood by one of ordinary skill in the art and will not be discussed in any further detail.

In accordance with the present invention, the buoyancy control system 280 preferably includes a sensor (not shown) which measures the buoyancy of the center pontoon 254. The control system 234 automatically and continuously monitors the output of the sensor to determine if the buoyancy of the center pontoon 254 is within a predetermined range of values.

In one embodiment, the fluid within the buoyancy control system 280 is preferably a mixture of water and ethylene glycol in percentages of 40% and 60%, respectively, although it will be understood that the percentages may vary according to operational requirements.

The foregoing description merely explains and illustrates the invention and the invention is not limited thereto, as those skilled in the art who have the disclosure before them will be able to make modifications without departing from the scope of the invention.

What is claimed is:

1. A valveless siphon decanter for processing fluid within a tank, comprising:
    a siphon tube external to the tank, the siphon tube having an output;
    a boom extending substantially transversely from the siphon tube, the boom providing a path for the communication of fluid from within the tank into the siphon tube;
    a vacuum head in association with the boom, the vacuum head having at least one orifice disposable within the tank for receiving the fluid, the vacuum head configured to float on the fluid in such a way that the at least one orifice is disposed above the fluid as the vacuum head floats;
    a vacuum source for creating a vacuum within the siphon tube and the boom to draw the fluid in through the at least one orifice of the vacuum head into the boom and into the siphon tube thereafter;
    a vacuum break for breaking the vacuum within the boom and the siphon tube; and
        wherein the siphon tube and the boom are configured to operate outside of contents of the tank when in use.

2. The decanter of claim 1, wherein the boom intersects the siphon tube to bifurcate the siphon tube into a first portion and a second portion.

3. The decanter of claim 2, further comprising a flexible section of pipe disposed between the first and second portions of the siphon tube and at least one stabilizer bar connected to the first portion and the second portion, above and below the flexible section of pipe to support the flexible section of pipe.

4. The decanter of claim 1, wherein the boom is pivotally connected to a sidewall of the tank.

5. The decanter of claim 1, wherein the vacuum break includes a sensor that senses the level of fluid within the siphon tube and outputs a signal indicative of the level and a control system monitoring output of the sensor, wherein the control system controls the operation of the vacuum source based upon output received from the sensor.

6. The decanter of claim 1, wherein the vacuum break includes a pipe connected to the siphon tube proximate a first portion of the siphon tube, the pipe having a terminal end disposed within the tank, wherein when the level of fluid within the tank goes below the terminal end of the pipe, the vacuum is broken causing a cessation of fluid flow.

7. The decanter of claim 6, wherein the length of the pipe is selectively adjustable to raise or lower the terminal end of the pipe within the tank.

8. The decanter of claim 1, wherein the vacuum head includes an elongated tubular member having a center, opposing ends, and plurality of orifices spaced apart from one another.

9. The decanter of claim 8, wherein the diameter of the orifices increases from the center of the elongated tubular member outwardly towards the ends of the elongated tubular member.

10. The decanter of claim 8, further comprising at least one pontoon associated with the elongated tubular member for floatably supporting the elongated tubular member on the surface of the fluid within the tank.

11. The decanter of claim 10, further comprising a buoyancy control system for adjusting the buoyancy of the at least one pontoon.

12. The decanter of claim 11, wherein the buoyancy control system includes:
    a fluid source in communication with the at least one pontoon via a pump capable of bidirectional fluid flow for introducing or removing fluid into the at least one pontoon;
    means for determining the buoyancy of the at least one pontoon; and
    a control system in communication with the means for determining the buoyancy of the at least one pontoon and controlling the operation of the pump.

13. The decanter of claim 8, further comprising two elongated pontoons and a central pontoon, one of the elongated pontoons disposed along a front surface of the elongated tubular member and the other elongated pontoon disposed along a rear surface of the elongated tubular member, the central pontoon disposed between the two elongated pontoons and below the center of the elongated tubular member.

14. The decanter of claim 13, further comprising a plurality of baffles extending between the two elongated pontoons, the baffles extending through a centerline of the orifices and at each of the opposing ends of the elongated tubular member.

15. The decanter of claim 14, wherein the baffles include mesh screens to further prevent debris from entering the orifices.

16. The decanter of claim 1, further comprising support legs extending downwardly from the vacuum head, the support legs contacting a bottom portion of the tank when the vacuum head has translated downwardly a predetermined distance into the tank.

17. The decanter of claim 1, wherein the vacuum head is connected to the boom via a flexible hose.

18. A sequencing batch reactor for processing wastewater, comprising:
    a tank for retaining and stratifying the wastewater to produce a substantially clear layer of water disposed below a debris layer;
    a siphon tube external to the tank, the siphon tube having an output;
    a boom extending substantially transversely from the siphon tube, the boom providing a path for the communication of water from within the tank into the siphon tube, a vacuum head configured to float on the fluid in such a way that the at least one orifice is disposed above the fluid as the vacuum head floats,
    the vacuum head being in association with the boom, the vacuum head having at least one orifice disposed within the tank for receiving the water;

means for positioning the at least one orifice of the vacuum head in the clear layer of water below the debris layer;

a vacuum source for creating a vacuum within the siphon tube and the boom to draw the clear water in through the at least one orifice of the vacuum head into the boom and into the siphon tube thereafter;

a vacuum break for breaking the vacuum within at least one of the boom and the siphon tube; and wherein the siphon tube and the boom are configured to operate outside of contents of the tank when in use.

19. The reactor of claim 18, wherein means for positioning the at least one orifice includes at least one pontoon associated with the boom.

\* \* \* \* \*